United States Patent
Harada

(10) Patent No.: US 10,800,890 B2
(45) Date of Patent: Oct. 13, 2020

(54) AQUEOUS RESIN DISPERSION, PAINT, ADHESIVE, AND LAMINATE

(71) Applicant: MITSUBISHI CHEMICAL CORPORATION, Tokyo (JP)

(72) Inventor: Akira Harada, Yokkaichi (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/419,684

(22) Filed: Jan. 30, 2017

(65) Prior Publication Data

US 2017/0137576 A1 May 18, 2017

Related U.S. Application Data

(63) Continuation of application No. PCT/JP2015/071823, filed on Jul. 31, 2015.

(30) Foreign Application Priority Data

Aug. 1, 2014 (JP) .................................. 2014-157776

(51) Int. Cl.
| | | |
|---|---|---|
| C08G 81/02 | (2006.01) | |
| C08L 23/00 | (2006.01) | |
| C08L 71/00 | (2006.01) | |
| C09D 171/02 | (2006.01) | |
| C08L 71/02 | (2006.01) | |
| C09J 187/00 | (2006.01) | |
| C09D 187/00 | (2006.01) | |
| C08J 3/03 | (2006.01) | |
| C08L 87/00 | (2006.01) | |
| C09J 171/02 | (2006.01) | |
| C08F 210/06 | (2006.01) | |
| C09D 5/02 | (2006.01) | |
| C09D 123/08 | (2006.01) | |
| C09D 123/14 | (2006.01) | |
| C09D 123/04 | (2006.01) | |
| C09D 171/00 | (2006.01) | |
| C09D 123/26 | (2006.01) | |
| C09D 123/12 | (2006.01) | |
| C08L 23/12 | (2006.01) | |
| C08L 23/04 | (2006.01) | |
| C08L 23/08 | (2006.01) | |
| C08L 23/14 | (2006.01) | |
| C08L 23/26 | (2006.01) | |

(Continued)

(52) U.S. Cl.
CPC ............. *C08G 81/025* (2013.01); *B05D 1/18* (2013.01); *B05D 1/28* (2013.01); *B05D 3/108* (2013.01); *C08F 210/06* (2013.01); *C08G 81/02* (2013.01); *C08J 3/03* (2013.01); *C08L 23/00* (2013.01); *C08L 71/00* (2013.01); *C08L 71/02* (2013.01); *C08L 87/00* (2013.01); *C09D 5/022* (2013.01); *C09D 171/02* (2013.01); *C09D 187/00* (2013.01); *C09D 187/005* (2013.01); *C09J 171/02* (2013.01); *C09J 187/00* (2013.01); *C09J 187/005* (2013.01); *B05D 3/02* (2013.01); *C08F 210/02* (2013.01); *C08F 210/04* (2013.01); *C08F 210/08* (2013.01); *C08F 255/02* (2013.01); *C08F 255/04* (2013.01); *C08F 2810/40* (2013.01); *C08G 81/00* (2013.01); *C08G 81/024* (2013.01); *C08G 2170/80* (2013.01); *C08L 23/04* (2013.01); *C08L 23/08* (2013.01); *C08L 23/0846* (2013.01); *C08L 23/12* (2013.01); *C08L 23/14* (2013.01); *C08L 23/147* (2013.01); *C08L 23/26* (2013.01); *C08L 87/005* (2013.01); *C09D 123/04* (2013.01); *C09D 123/08* (2013.01); *C09D 123/0846* (2013.01); *C09D 123/12* (2013.01); *C09D 123/14* (2013.01); *C09D 123/147* (2013.01); *C09D 123/26* (2013.01); *C09D 171/00* (2013.01); *C09J 123/04* (2013.01); *C09J 123/08* (2013.01); *C09J 123/0846* (2013.01); *C09J 123/12* (2013.01); *C09J 123/14* (2013.01); *C09J 123/26* (2013.01); *C09J 171/00* (2013.01); *C09J 201/02* (2013.01); *C09J 2453/00* (2013.01); *Y10T 428/31938* (2015.04)

(58) Field of Classification Search
None
See application file for complete search history.

(56) References Cited

U.S. PATENT DOCUMENTS 3,860,425 A * 1/1975 Ono ....................... B41M 5/132
430/139
3,976,626 A * 8/1976 Turck ........................ C08F 2/26
526/81

(Continued)

FOREIGN PATENT DOCUMENTS

EP 2314648 A 4/2011
JP 03-182534 A 8/1991

(Continued)

OTHER PUBLICATIONS

"The JEFFAMINE Polyetherannines" (2007) (Year: 2007).*

(Continued)

*Primary Examiner* — Vivian Chen
(74) *Attorney, Agent, or Firm* — Leason Ellis LLP

(57) ABSTRACT

An aqueous resin dispersion wherein a polymer (C) obtained by bonding a polyolefin (A) to a polyether resin (B) is dispersed in water; and the polyether resin (B) contains a polyether resin (B1) having an HLB of less than 8 and a polyether resin (B2) having an HLB of 8 to 20 according to calculation by the Griffin method.

11 Claims, No Drawings

(51) Int. Cl.

| | |
|---|---|
| C08F 210/04 | (2006.01) |
| C08F 210/02 | (2006.01) |
| C08F 210/08 | (2006.01) |
| C08F 255/02 | (2006.01) |
| C08F 255/04 | (2006.01) |
| C08G 81/00 | (2006.01) |
| C09J 123/26 | (2006.01) |
| C09J 123/04 | (2006.01) |
| C09J 123/12 | (2006.01) |
| C09J 201/02 | (2006.01) |
| C09J 123/08 | (2006.01) |
| C09J 171/00 | (2006.01) |
| C09J 123/14 | (2006.01) |
| B05D 1/18 | (2006.01) |
| B05D 1/28 | (2006.01) |
| B05D 3/10 | (2006.01) |
| B05D 3/02 | (2006.01) |

(56) References Cited

U.S. PATENT DOCUMENTS

| | | | | |
|---|---|---|---|---|
| 4,089,699 A * | 5/1978 | Blackburn | ......... | C09B 67/0004 523/200 |
| 4,453,023 A * | 6/1984 | McCain | ......... | C07C 41/03 568/618 |
| 5,242,969 A * | 9/1993 | Arpin | ......... | C03C 25/30 524/458 |
| 5,589,534 A * | 12/1996 | Metzger | ......... | C09D 133/062 523/402 |
| 5,721,315 A | 2/1998 | Evans et al. | | |
| 5,756,566 A * | 5/1998 | Laura | ......... | B32B 7/12 524/186 |
| 5,948,546 A * | 9/1999 | Bafford | ......... | B32B 27/30 156/326 |
| 5,959,032 A * | 9/1999 | Evans | ......... | C08F 8/30 524/504 |
| 6,143,830 A * | 11/2000 | Utz | ......... | A01N 25/30 514/63 |
| 6,166,118 A * | 12/2000 | Hyche | ......... | C08J 3/03 523/326 |
| 6,258,889 B1 * | 7/2001 | Mizuguchi | ......... | C08F 255/00 524/531 |
| 6,512,024 B1 * | 1/2003 | Lundgard | ......... | C08G 18/0804 523/335 |
| 6,624,234 B1 * | 9/2003 | Itakura | ......... | C09J 133/064 524/501 |
| 6,774,181 B1 | 8/2004 | Bechara et al. | | |
| 7,659,356 B2 * | 2/2010 | Ashihara | ......... | C09D 123/10 526/351 |
| 7,812,106 B2 * | 10/2010 | Breuer | ......... | C08F 222/20 526/317.1 |
| 8,012,540 B2 * | 9/2011 | Wautier | ......... | B82Y 30/00 427/384 |
| 8,546,481 B2 * | 10/2013 | MacHida | ......... | C08F 2/18 524/547 |
| 2001/0003770 A1 * | 6/2001 | Okubo | ......... | C08F 265/04 525/231 |
| 2003/0036581 A1 * | 2/2003 | Kuroda | ......... | C08F 255/026 522/153 |
| 2004/0260008 A1 * | 12/2004 | Bechara | ......... | C08G 18/0823 524/507 |
| 2005/0100754 A1 | 5/2005 | Moncla et al. | | |
| 2006/0069187 A1 * | 3/2006 | Klosiewicz | ......... | C08F 8/00 524/284 |
| 2006/0069209 A1 * | 3/2006 | Klosiewicz | ......... | C08F 255/00 525/242 |
| 2006/0100356 A1 * | 5/2006 | Klosiewicz | ......... | C08F 8/00 524/556 |
| 2008/0032055 A1 * | 2/2008 | Ogawa | ......... | C08F 255/02 427/402 |
| 2009/0061247 A1 * | 3/2009 | Chino | ......... | C08F 255/00 428/500 |
| 2009/0092847 A1 * | 4/2009 | Onoe | ......... | B32B 27/08 428/500 |
| 2009/0130322 A1 * | 5/2009 | Nagano | ......... | C08G 18/6204 427/407.1 |
| 2009/0226728 A1 * | 9/2009 | Onoe | ......... | C08F 255/00 428/413 |
| 2011/0112229 A1 * | 5/2011 | Nagaoka | ......... | C09J 123/0869 524/186 |
| 2012/0077950 A1 * | 3/2012 | Darragas | ......... | B01F 17/005 528/78 |
| 2013/0059165 A1 * | 3/2013 | Malotky | ......... | C08L 51/00 428/523 |
| 2014/0005322 A1 * | 1/2014 | Akkerman | ......... | C08F 220/18 524/501 |
| 2014/0377466 A1 * | 12/2014 | Tielemans | ......... | C09D 5/027 427/379 |
| 2015/0073081 A1 * | 3/2015 | Aso | ......... | C08J 3/03 524/375 |
| 2017/0096562 A1 * | 4/2017 | Noguchi | ......... | C01F 5/02 |

FOREIGN PATENT DOCUMENTS

| | | |
|---|---|---|
| JP | 06-256592 A | 9/1994 |
| JP | 07-145216 A | 6/1995 |
| JP | 2004-115712 A * | 4/2004 |
| JP | 2004-115712 A | 4/2004 |
| JP | 2007-246871 A | 9/2007 |
| JP | 2007-270122 A | 10/2007 |
| JP | 2008-031360 A * | 2/2008 |
| JP | 2008-031360 A | 2/2008 |
| JP | 2008-223040 A | 9/2008 |
| JP | 2010-189658 A | 9/2010 |
| JP | 2011-177992 A | 9/2011 |
| WO | WO-2010-018863 A1 | 2/2010 |
| WO | WO-2014/038574 A | 3/2014 |

OTHER PUBLICATIONS

"JEFFAMINE Polyetheramines—Technical Bulletin" (2012) (Year: 2012).*

International Search Report dated Nov. 2, 2015 for the corresponding PCT Application No. PCT/JP2015/071823.

Extended European Search Report dated Jul. 11, 2017 for the corresponding European Patent Application No. 15828107.1.

Office Action dated Nov. 20, 2018 for the corresponding Japanese Patent Application No. 2015-149711 (an English translation attached hereto).

Office Action dated Mar. 11, 2019 for the corresponding European Patent Application No. 15828107.1.

Office Action dated Mar. 19, 2019 for the corresponding Chinese Patent Application No. 201580041497.4.

Office Action dated Oct. 15, 2019 for the corresponding Chinese Patent Application No. 201580041497.4.

* cited by examiner

AQUEOUS RESIN DISPERSION, PAINT, ADHESIVE, AND LAMINATE

CROSS REFERENCE TO RELATED APPLICATIONS

This is a continuation of International Application No. PCT/JP2015/071823 filed on Jul. 31, 2015, and claims priority from Japanese Patent Application No. 2014-157776 filed on Aug. 1, 2014, the entire disclosures of which are incorporated herein by reference.

TECHNICAL FIELD

The present invention relates to an aqueous resin dispersion containing a polyolefin resin, and a coating material and an adhesive each containing the same. The present invention also relates to a laminate using the aqueous resin dispersion.

BACKGROUND ART

A polyolefin such as a propylene polymer or a propylene·α-olefin copolymer is inexpensive and moreover, excellent in mechanical properties, heat resistance, chemical resistance, water resistance, etc. and is therefore used in a wide range of fields, such as automobile, home electronics or food packaging. However, since the polyolefin does not have a polar group in the molecule, it is generally of low polarity, by which coating and adhesion are difficult. Therefore, improvements thereof are demanded.

Conventionally, various surface treatments such as chemical treatment with chemicals and oxidation treatment by corona discharge treatment, plasma treatment, flame treatment, etc. have been proposed so as to improve the coatability and adhesiveness of a polyolefin molding. However, these methods require a special apparatus and in addition, the effect of improving the coatability or adhesiveness is not always sufficient.

Accordingly, as an effort to impart good coatability and adhesiveness to a polyolefin by a relatively simple and easy method, a method where a modified polyolefin resin, such as so-called chlorinated polypropylene, acid-modified propylene·α-olefin copolymer or acid-modified chlorinated polypropylene, is applied as surface treatment agent, an adhesive, a coating material, etc. onto a surface of a polyolefin molding has been developed.

Such a modified polyolefin is usually applied in the form of a solution in an organic solvent or a dispersion in water, and in view of safety, hygiene and environmental pollution, an aqueous resin dispersion is preferably used in recent years.

As an aqueous resin dispersion of a modified polyolefin resin, there has been proposed, for example, an aqueous resin dispersion in which an acid-modified chlorinated polyolefin is rendered aqueous by using a surfactant and a basic substance (Patent Document 1), or an aqueous resin composition in which an acid-modified polyolefin is rendered aqueous by using a surfactant and a basic substance (Patent Documents 2 and 3).

On the other hand, a method for obtaining an aqueous resin dispersion by using substantially no surfactant has also been proposed (Patent Documents 4, 5 and 6). For example, in Patent Documents 4 and 5, it has been proposed to add a hydrophilic polymer (B) such as polyether resin to a polyolefin (A) in a ratio of (A):(B)=100:5 to 100:500 (weight ratio) to prepare a polymer (C) and thereby obtain an aqueous resin dispersion without use of a surfactant.

In Patent Documents 4 and 5, the hydrophilic polymer (B) is defined as a polymer satisfying the condition that when the polymer is dissolved in water at 25° C. to a concentration of 10 wt %, the insoluble content is 1 wt % or less, and this polymer corresponds to the polyether resin (B2) having an HLB of 8 to 20 in the present invention.

In Patent Document 6, as a hydrophilic polymer to be combined with a polyolefin, those using polyethylene glycol, etc. have been proposed.

PRIOR ART LITERATURE

Patent Document

Patent Document 1: JP-A-3-182534
Patent Document 2: JP-A-6-256592
Patent Document 3: U.S. Patent Application Publication No. 2005/0100754
Patent Document 4: JP-A-2007-246871
Patent Document 5: JP-A-2007-270122
Patent Document 6: U.S. Pat. No. 6,774,181

SUMMARY OF THE INVENTION

Problems that the Invention is to Solve

In the methods of Patent Documents 1 to 3, a surfactant must be used for dispersing a resin in water, and a coating material using such an aqueous resin dispersion has a problem that the water resistance or the chemical resistance is poor. In addition, after coating, the surfactant sometimes bleeds out to the coating film surface to cause an appearance failure, and further improvement is demanded.

According to the methods of Patent Documents 4 to 6, although an aqueous resin dispersion having a small particle diameter is obtained without using a surfactant, the obtained aqueous resin dispersion is not sufficient in the blocking resistance or wettability. In the case of applying the aqueous resin dispersion by roller coating or dip coating, it is therefore required to blend an anti-blocking agent or a wetting agent, and the blended anti-blocking agent or wetting agent sometimes bleeds out to the coating film surface to cause an appearance failure.

In turn, the methods of Patent Documents 4 to 6 have a problem that the coating method is limited, and in order to solve this problem, improvement of blocking resistance and wettability of the aqueous resin dispersion is demanded.

An object of the present invention is to provide an aqueous resin dispersion containing a polyolefin resin, which is an aqueous resin dispersion excellent in blocking resistance and wettability and can be easily coated by either roller coating or dip coating, a coating material and an adhesive each containing the aqueous resin dispersion, and a laminate using the aqueous resin dispersion.

Means for Solving the Problems

As a result of intensive studies to achieve the above-described object, the present inventors have found that when a polyether resin (B1) having an HLB of less than 8 according to calculation by the Griffin method is used in a predetermined ratio as a polyether resin (B) bonded to a polyolefin (A), the blocking resistance and wettability can be improved.

That is, the gist of the present invention resides in the followings.

[1] An aqueous resin dispersion wherein a polymer (C) obtained by bonding a polyolefin (A) to a polyether resin (B) is dispersed in water; and the polyether resin (B) contains a polyether resin (B1) having an HLB of less than 8 and a polyether resin (B2) having an HLB of 8 to 20 according to calculation by the Griffin method.

[2] The aqueous resin dispersion according to [1], wherein the weight average molecular weight [Mw] of the polyether resin (B1) and the polyether resin (B2) is from 500 to 3,000.

[3] The aqueous resin dispersion according to [1] or [2], wherein the polyolefin (A) is a polyolefin (A1) having no reactive group or a polyolefin (A2) having a reactive group.

[4] The aqueous resin dispersion according to any one of [1] to [3], wherein the polyolefin (A2) contains one or more reactive groups (D) selected from the group consisting of a carboxylic acid group, a dicarboxylic anhydride group and a dicarboxylic anhydride monoester group, in a ratio of polyolefin (A2):reactive group (D)=100:0.1 to 100:5 (weight ratio).

[5] The aqueous resin dispersion according to any one of [1] to [4], wherein the polyolefin (A) is a propylene-α-olefin copolymer having a weight average molecular weight [Mw] of 10,000 to 300,000 and a propylene content of 50 mol % or more.

[6] The aqueous resin dispersion according to any one of [1] to [5], wherein the polyether resin (B) has, as a reactive group, at least either one of an amino group and a hydroxyl group.

[7] The aqueous resin dispersion according to any one of [1] to [6], wherein HLB of the polyether resin (B1) is 1 to 6 and HLB of the polyether resin (B2) is 10 to 20.

[8] A coating material containing the aqueous resin dispersion according to any one of [1] to [7].

[9] An adhesive containing the aqueous resin dispersion according to any one of [1] to [7].

[10] A laminate obtained through steps of applying the aqueous resin dispersion according to any one of [1] to [7] or the coating material according to [8], and heating.

Effect of the Invention

The aqueous resin dispersion of the present invention is excellent in blocking resistance and wettability and can therefore be easily applied by roller coating, dip coating, etc. without blending an anti-blocking agent or a wetting agent. Accordingly, the coating method of the aqueous resin dispersion is advantageously not limited, application to a wide range of uses is therefore facilitated, and at this time, the problem of appearance failure due to bleed-out of an anti-blocking agent or a wetting agent is resolved.

Here, the aqueous resin dispersion of the present invention can be formed as a uniform dispersion without using a surfactant or by adding a very small amount of a surfactant, so that bleed-out due to a surfactant can be suppressed and a product with excellent exterior appearance can be obtained.

MODE FOR CARRYING OUT THE INVENTION

The embodiment of the present invention is described in detail below.

In the present description, the "(meth)acryl" is a generic term of "acryl" and "methacryl".

In the present description, "(numerical value) to (numerical value)" is used to mean that the numerical values before and after "to" are included as a lower limit value and an upper limit value.

[Aqueous Resin Dispersion]

The aqueous resin dispersion of the present invention is an aqueous resin dispersion wherein a polymer (C) obtained by bonding a polyolefin (A) to a polyether resin (B) is dispersed in water; and the polyether resin (B) contains a polyether resin (B1) having an HLB of less than 8 and a polyether resin (B2) having an HLB of 8 to 20 according to calculation by the Griffin method.

[Polyolefin (A)]

As the polyolefin (A), a polyolefin (A1) having no reactive group or a polyolefin (A2) having a reactive group may be used.

In the present invention, a polyolefin (A1) having no reactive group as well as a polyolefin (A2) having a reactive group may be appropriately used according to the combination with the polyether resin (B) or the properties, etc. of the target polymer (C), and a polyolefin (A2) having a reactive group is preferred. The polyolefin (A2) is advantageous, for example, in that the bonding amount of the polyether resin (B) is easy to control and the reaction used for bonding is diversified.

<Polyolefin (A1) Having No Reactive Group>

As the polyolefin (A1) having no reactive group, various known polyolefins and modified polyolefins may be used. Examples thereof include, although they are not particularly limited to, a homopolymer of ethylene or propylene, a copolymer of ethylene and propylene, and a copolymer of ethylene and/or propylene with another comonomer.

The copolymer of ethylene and/or propylene with another copolymer includes, specifically, for example, a copolymer with an α-olefin comonomer having a carbon number of 2 or more, such as butene-1, pentene-1, hexene-1, heptene-1, octene-1, cyclopentene, cyclohexane and norbornene, and a copolymer of two or more kinds of these comonomers.

It is preferable that the α-olefin comonomer is an α-olefin comonomer having a carbon number of 2 to 6. In addition, a copolymer of an α-olefin comonomer with a comonomer such as vinyl acetate, acrylic acid ester or methacrylic acid ester; a copolymer of an α-olefin comonomer with a comonomer such as aromatic vinyl monomer, or a hydrogen adduct thereof; a conjugated diene block copolymer or a hydrogen adduct thereof; etc. may also be used.

Furthermore, a chlorinated polyolefin obtained by chlorinating such a polyolefin may also be used. The chlorination degree of the chlorinated polyolefin is usually 5 wt % or more; and 10 wt % or more is preferable, and the chlorination degree is usually 50 wt % or less; and 30 wt % or less is preferable.

In the present invention, the copolymer in case of being simply referred to as a copolymer may be a random copolymer or a block copolymer.

In addition, the polyolefin (A1) may be linear or branched.

The polyolefin (A1) includes, specifically, for example, a polyethylene, a polypropylene, an ethylene-propylene copolymer, a propylene-butene copolymer, a propylene-hexene copolymer, a chlorinated polyethylene, a chlorinated polypropylene, a chlorinated ethylene-propylene copolymer, a chlorinated propylene-butene copolymer, an ethylene-vinyl acetate copolymer, a hydrogen adduct (SEBS) of styrene-butadiene-styrene block copolymer, and a hydrogen adduct (SEPS) of styrene-isoprene-styrene block copolymer.

A propylene homopolymer and a copolymer of propylene with another α-olefin are preferred, and these may be chlorinated. A propylene homopolymer, an ethylene-propylene copolymer, a propylene-butene copolymer, and an ethylene-propylene-butene copolymer, each containing substantially no chlorine, are more preferred. One of these may be used alone, or two or more thereof may be used in combination.

The polyolefin (A1) is preferably produced by a polymerization reaction in the presence of a metallocene catalyst.

It is preferable that the melting point of the polyolefin (A1) is 125° C. or less; 100° C. or less is more preferable; and 90° C. or less is still more preferable. As the melting point of the polyolefin (A1) is lower, a higher adherence tends to be obtained even when it is dried at a low temperature.

It is preferable that the polyolefin (A1) is a polypropylene-based polymer containing from 50 to 100 mol % of a propylene component. It is more preferable that the propylene content of the polyolefin (A1) is 60 mol % or more; and 70 mol % or more is still more preferable.

Usually, as the propylene content is higher, the adherence to a polypropylene substrate tends to increase. Here, the propylene content is a ratio of a propylene-derived constituent unit to the constituent units derived from all monomers constituting the polyolefin (A1).

In the case where the polyolefin (A1) is a propylene homopolymer or a polypropylene copolymer, as for the stereoregularity thereof, those having an isotactic structure in whole or in part are preferred. For example, as well as normal isotactic polypropylene, an isotactic block polypropylene, a stereo-block polypropylene, etc. described in JP-A-2003-231714 and U.S. Pat. No.4,522,982 may also used.

One preferred embodiment of the polypropylene of the polyolefin (A1) is a homopolymer or copolymer of a stereo-block polypropylene having an isotactic block and an atactic block. Preferably, the pentad ratio "mmmm" indicating the isotactic stereoregularity is from 20 to 90%. It is preferable that the lower limit value of the pentad ratio is 30%; and 35% is more preferable, and on the other hand, it is preferable that the upper limit value is 80%; 70% is more preferable; and 60% is still more preferable.

As the pentad ratio is higher relative to the lower limit value above, the degree of stickiness tends to be reduced, and as the pentad ratio is lower relative to the upper limit value above, the degree of crystallinity tends to be reduced, making it easy to prepare the resin dispersion. As to the method for measuring the pentad ratio, the method described in JP-A-2003-231714 may be used.

In addition, generally available polypropylene-based polymers include, for example, "WINTEC" and "WELNEX" produced by Japan Polypropylene Corporation, "TAFMER XM" produced by Mitsui Chemicals Inc., and "LICOCENE PP" produced by Clariant International Ltd. All of these are a polypropylene-based copolymer polymerized with using a metallocene catalyst.

The polyolefin (A1) for use in the present invention preferably has a weight average molecular weight [Mw] of 5,000 to 500,000 according to measurement by GPC (Gel Permeation Chromatography) and conversion with using a calibration curve of each polyolefin.

It is preferable that the lower limit value of Mw is 10,000; and 30,000 is more preferable, and it is preferable that the upper limit value of Mw is 400,000; and 300,000 is more preferable. As Mw is higher relative to the lower limit value above, it is likely that the degree of stickiness becomes large and the adherence to a base material is increased, while as the molecular weight is lower relative to the upper limit value above, the viscosity tends to be decreased, making it easy to prepare the resin dispersion.

In the polyolefin (A1), the molecular weight distribution [Mw/Mn] as a ratio of the weight average molecular weight [Mw] to the number average molecular weight [Mn], which are measured by GPC and converted using a calibration curve of each polyolefin, is preferably from 10 to 1; more preferably from 5 to 1; and still more preferably from 3 to 1.

When [Mw/Mn] is higher than the lower limit value above, the viscosity tends to decrease at the time of production, facilitating the production, while as the molecular weight distribution is lower relative to the upper limit value above, it is likely that the particle diameter is easy to control at the time of dispersion in water and narrow particle diameter distribution and stable dispersion are achieved.

Here, the GPC measurement is performed by a conventionally known method by using o-dichlorobenzene, etc. as a solvent and using a commercially available apparatus. Specifically, the measurement is performed as described later in Examples.

The production method of the polyolefin (A1) is not particularly limited and may be any production method as long as a polymer (C) satisfying the requirements of the present invention can be produced. The production method includes, for example, radical polymerization, cationic polymerization, anionic polymerization, and coordination polymerization, and the form of each polymerization may be living polymerization.

In the case of coordination polymerization, the production method includes, for example, a method of polymerizing the polymer by a Ziegler-Natta catalyst, and a method of polymerizing the polymer by a single site catalyst or a Kaminsky catalyst. The preferable production method is a production method using a single site catalyst. The reason therefor is, for example, that in general, with a single site catalyst, the molecular weight distribution or stereoregularity distribution can be made sharp by designing the ligand.

The single site catalyst includes, for example, a metallocene catalyst and a Brookhart catalyst. In the case of a metallocene catalyst, a preferable catalyst, such as C1-symmetric type, C2-symmetric type, C2V-symmetric type or CS-symmetric type, may be selected according to the stereoregularity of the polyolefin polymerized. Preferably, a C1-symmetric or C2-symmetric metallocene catalyst may be used.

The polymerization may be in any polymerization form of solution polymerization, slurry polymerization, bulk polymerization or gas-phase polymerization. In the case of solution polymerization or slurry polymerization, the solvent includes, for example, an aromatic hydrocarbon such as toluene and xylene, an aliphatic hydrocarbon such as hexane, octane and decane, an alicyclic aliphatic hydrocarbon such as cyclohexane and methylcyclohexane, a halogenated hydrocarbon such as chloroform and chlorobenzene, esters such as ethyl acetate and butyl acetate, ketones such as acetone, methyl ethyl ketone, methyl isobutyl ketone and cyclohexanone, alcohols such as methanol, ethanol, isopropanol and n-butanol, ethers such as dibutyl ether and tetrahydrofuran, and polar solvents such as dimethylformamide and dimethylsulfoxide.

Among these, an aromatic hydrocarbon, an aliphatic hydrocarbon and an alicyclic hydrocarbon are preferred, and toluene, xylene, hexane, heptane, cyclopentane and cyclohexane are more preferred. One of these may be used alone, or two or more thereof may be used in combination.

<Polyolefin (A2) Having Reactive Group>

The reactive group in the polyolefin (A2) having a reactive group includes, for example, a carboxylic acid group, a dicarboxylic anhydride group, a dicarboxylic anhydride monoester group, a hydroxyl group, an amino group, an epoxy group, and an isocyanate group. Preferably, the polyolefin (A2) has at least one member selected from the group consisting of a carboxylic acid group, a dicarboxylic anhydride group and a dicarboxylic anhydride monoester group. Not only these carboxylic acid groups, etc. are highly reactive and can be easily bonded to the polyether resin (B) but also since there are many unsaturated compounds having such a group, the copolymerization or grafting reaction for introducing a reactive group into the polyolefin is facilitated.

As to the polyolefin (A2) having a reactive group, for example, a copolymer (A2a) obtained by copolymerizing an unsaturated compound having no reactive group with an unsaturated compound having a reactive group at the time of polymerization, or a copolymer (A2b) obtained by graft-polymerizing a radical polymerizable unsaturated compound having a reactive group to a polyolefin, may be used.

As the polyolefin (A2) having a reactive group, although both the copolymer (A2a) and the copolymer (A2b) may be used, the copolymer (A2b) is usually preferred. The copolymer (A2b) is advantageous, for example, in that the bonding amount of the polyether resin (B) is easy to control.

The copolymer (A2a) is a copolymer obtained by copolymerizing an unsaturated compound having no reactive group with an unsaturated compound having a reactive group, in which the unsaturated compound having a reactive group is inserted into the main chain. The copolymer is obtained, for example, by copolymerizing an α-olefin such as ethylene, propylene or butene with an $\alpha,\beta$-unsaturated carboxylic acid or its anhydride, such as acrylic acid or maleic anhydride.

The copolymer (A2a) includes, specifically, for example, an ethylene-acrylic acid copolymer and an ethylene-acrylic acid ester-maleic anhydride copolymer. One of these may be used alone, or two or more thereof may be used in combination. As for the production method of the copolymer (A2a), the method described for the polyolefin (A1) may be used in the same manner.

The copolymer (A2b) is a polymer obtained by graft-polymerizing a reactive group-containing radical polymerizable unsaturated compound to a preliminarily polymerized polyolefin, in which the unsaturated compound having a reactive group is grafted to the main chain.

The polymer is, for example, a polymer obtained by grafting (meth)acrylic acid, fumaric acid, maleic acid or its anhydride, itaconic acid or its anhydride, crotonic acid, 2-hydroxyethyl (meth)acrylate, 2-hydroxypropyl (meth)acrylate, (meth)acrylamide, (dimethylamino)ethyl (meth)acrylate, glycidyl (meth)acrylate, (2-isocyanato)ethyl (meth)acrylate, etc. to a polyolefin such as polyethylene or polypropylene. One of these polymers may be used alone, or two or more thereof may be used in combination.

As the polyolefin in this reaction for obtaining the copolymer (A2b), the above-described polyolefin (A1) having no reactive group may be used.

The radical polymerization initiator used for the graft polymerization may be appropriately selected from normal radical polymerization initiators and includes, for example, an organic peroxide and azonitrile.

The organic peroxide includes, for example, peroxyketals such as di(tert-butylperoxy)cyclohexane, hydroperoxides such as cumene hydroperoxide, dialkyl peroxides such as di(tert-butyl) peroxide, diacyl peroxides such as benzoyl peroxide, and peroxyesters such as tert-butylperoxyisopropyl monocarbonate.

The azonitrile includes, for example, azobisbutyronitrile and azobisisopropylnitrile. Among others, benzoyl peroxide and tert-butylperoxyisopropyl monocarbonate are preferred. One of these may be used alone, or two or more thereof may be used in combination.

The use ratio of the radical polymerization initiator to the radical polymerizable unsaturated compound having a reactive group is usually radical polymerization initiator:the radical polymerizable unsaturated compound having a reactive group=from 1:100 to 2:1 (molar ratio), preferably from 1:20 to 1:1.

The production method of the copolymer (A2b) is not particularly limited and may be any method as long as a polymer (C) satisfying the requirements of the present invention can be produced. The production method includes, for example, a method involving heating and stirring to cause a reaction in a solution, a method involving melting, heating and stirring to cause a reaction in the absence of a solvent, and a method involving heating and kneading to cause a reaction in an extruder. As to the solvent in the case of producing the polymer in a solution, the solvents recited as the solvent used in the production of the polyolefin (A1) may be used in the same manner.

The reaction temperature is usually 50° C. or more, preferably from 80 to 250° C. The reaction time is usually about 1 to 20 hours.

The copolymer (A2b) includes, specifically, for example, a maleic anhydride-modified polypropylene and its chlorinated product, a maleic anhydride-modified ethylene-propylene copolymer and its chlorinated product, a maleic anhydride-modified propylene-butene copolymer, an acrylic acid-modified propylene and its chlorinated product, an acrylic acid-modified ethylene-propylene copolymer and its chlorinated product, and an acrylic acid-modified propylene-butene copolymer. One of these may be used alone, or two or more thereof may be used in combination.

The polyolefin (A2) having a reactive group preferably has a weight average molecular weight [Mw] of 5,000 to 300,000 in measurement by GPC and converted with using a calibration curve of a polystyrene. It is preferable that the lower limit value of Mw is 10,000; and 30,000 is more preferable, and it is preferable that the upper limit value of Mw is 280,000; and 250,000 is more preferable. As Mw is higher relative to the lower limit value above, it is likely that the degree of stickiness becomes large and the adherence to the base material is increased, and as the molecular weight is lower relative to the upper limit value above, the viscosity tends to be decreased, making it easy to prepare the resin dispersion.

In the polyolefin (A2), the molecular weight distribution [Mw/Mn] that is a ratio of the weight average molecular weight [Mw] to the number average molecular weight [Mn], which are measured by GPC and converted with using a calibration curve of each polyolefin, is preferably from 10 to 1; more preferably from 5 to 1; and still more preferably from 3 to 1. When [Mw/Mn] is higher than the lower limit value above, the viscosity tends to decrease at the time of production, facilitating the production, and as the molecular weight distribution is lower relative to the upper limit value above, it is likely that the particle diameter is easy to be controlled at the time of dispersion in water and narrow particle diameter distribution and stable dispersion are achieved.

Here, the GPC measurement is performed by a conventionally known method by using tetrahydrofuran (THF), etc. as a solvent and using a commercially available apparatus. Specifically, the measurement is performed as described later in Examples.

The content of the reactive group in the polyolefin (A2) having a reactive group is preferably from 0.01 to 5 mmol per 1 g of the polyolefin (A2), i.e., from 0.01 to 5 mmol/g. It is more preferable that the lower limit value is more 0.03 mmol/g; 0.05 mmol/g is still more preferable, and it is more preferable that the upper limit value is 1 mmol/g; and 0.5 mmol/g is still more preferable.

In particular, the polyolefin (A2) having a reactive group preferably has one or more reactive groups (D) selected from the group consisting of a carboxylic acid group, a dicarboxylic anhydride group and a dicarboxylic anhydride monoester group, in a ratio of polyolefin (A2) which has the reactive group:reactive group (D)=from 100:0.1 to 100:5 (weight ratio). It is more preferable that this ratio is polyolefin (A2):reactive group (D)=from 100:0.5 to 100:4; and 100:1 to 100:3 is still more preferable.

As the content of the reactive group in the polyolefin (A2) is higher relative to the lower limit value above, it is likely that the bonding amount of the polyether resin (B) bonded through the reactive group increases to enhance the hydrophilicity of the polymer (C) and the dispersed particle diameter is thereby reduced, and as the content is lower relative to the upper limit value, the adherence to the crystalline polyolefin as a substrate tends to increase.

Here, when the polyolefin (A2) is the copolymer (A2b), the weight ratio of the reactive group (D) in the polyolefin (A2) corresponds to the graft ratio.

[Polyether Resin (B)]

In the present invention, the polyether resin (B) can be used without any particular limitation as long as the effects of the present invention are not significantly impaired, and any of a synthetic polymer, a semisynthetic polymer and a natural polymer may be used.

The polyether resin (B) for use in the present invention is obtained usually by subjecting a cyclic alkylene oxide or a cyclic alkylene imine to ring-opening polymerization. Although the method for bonding the polyether resin (B) to the polyolefin (A) is not particularly limited, the method includes, for example, a method of subjecting a cyclic alkylene oxide to ring-opening polymerization in the polyolefin (A2) having a reactive group, and a method of reacting a reactive group of, e.g., a polyether polyol or polyether amine obtained by ring-opening polymerization, etc., with the reactive group of the polyolefin (A2).

The polyether polyol is a compound having, as a reactive group, a hydroxyl group at both terminals of a resin having a polyether skeleton. The polyether amine is a compound having, as a reactive group, a primary amino group at one terminal or both terminals of a resin having a polyether skeleton. Examples of polyalkylene oxide and polyalkylene imine having the hydrophilicity preferably include polyethylene oxide and polyethylene imine.

The polyether amine includes, for example, "JEFFAMINE" M Series, D Series and ED Series, and "SURFONAMINE" L Series, produced by Huntsman Corporation.

Before bonding to the polyolefin (A), the polyether resin (B) for use in the present invention preferably has one or more reactive groups capable of reacting with the polyolefin (A). The reactive group includes, for example, a carboxylic acid group, a dicarboxylic anhydride group, a dicarboxylic anhydride monoester group, a hydroxyl group, an amino group, an epoxy group, and an isocyanate group. Among these, it is preferable to have at least either one of an amino group and a hydroxyl group, and it is more preferable to have at least an amino group.

Since the amino group has high reactivity with various reactive groups such as carboxylic acid group, carboxylic anhydride group, glycidyl group or isocyanate group, it facilitates bonding of the polyolefin (A) and the polyether resin (B). The amino group may be any of primary, secondary and tertiary and a primary amino group is preferable.

Although it may be sufficiently if one or more reactive groups are present in the polyether resin (B), it is more preferable to have only one reactive group. If two or more reactive groups are present, a three-dimensional network structure may be formed to cause gelling at the time of bonding to the polyolefin (A).

However, as long as only one reactive group has higher reactivity than others, the resin may have a plurality of reactive groups. For example, a polyether resin (B) containing a plurality of hydroxyl groups and one amino group having higher reactivity than the hydroxyl groups is a preferable case. Here, the reactivity is reactivity with a reactive group contained in the polyolefin (A).

The polyether resin (B) preferably used in the present invention includes a block copolymer of a polyether block containing an alkylene group having a carbon number of 2 and a polyether block containing an alkylene group having a carbon number of 3 to 4. As long as the effects of the present invention are not significantly impaired, two or more polyether blocks each containing an alkylene group having a carbon number of 3 to 4 may be contained in the block copolymer.

The polyether resin (B) preferably used in the present invention includes those represented by the following formula (1).

[Chem. 1]

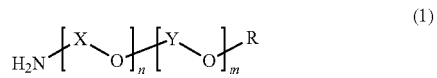
(1)

In formula (1), X is an alkylene group having a carbon number of 3 to 4, Y is an alkylene group having a carbon number of 2, R is a hydrogen atom, an amino group, or an alkyl group having a carbon number of 1 to 3, n is a number of preferably from 1 to 40, and m is a number of preferably from 1 to 30.

The present invention is characterized in that a polyether resin (B1) having an HLB of less than 8 and a polyether resin (B2) having an HLB of 8 to 20, in calculation by the Griffin method, are used in combination as the polyether resin (B).

<Polyether Resin (B1)>

As for the polyether resin (B1), any of polyether resins recited for the polyether resin (B) may be used as long as HLB calculated by the Griffin method is less than 8.

As HLB of the polyether resin (B1) is lower relative to the upper limit value above, the surface energy of the aqueous resin dispersion tends to be reduced, leading to good wettability. On the other hand, as HLB of the polyether resin (B1) is higher, the viscosity tends to be lower, making it easy to prepare the resin dispersion. The HLB of the polyether resin (B1) is preferably from 1 to 6, and more preferably from 1 to 4.

The polyether resin (B1) for use in the present invention preferably has a weight average molecular weight [Mw] of 200 to 200,000 in measurement by GPC and converted with using a calibration curve of a polystyrene. It is preferable that the lower limit value of Mw is 300; and 500 is more preferable, and it is preferable that the upper limit value of Mw is 100,000; 10,000 is more preferable; and 3,000 is still more preferable.

As Mw is higher relative to the lower limit value above, the surface energy of the aqueous resin dispersion tends to be reduced, leading to good wettability, and as Mw is lower relative to the upper limit value above, the viscosity tends to be lower, making it easy to prepare the resin dispersion. Here, the GPC measurement is performed by a conventionally known method by using THF, etc. as a solvent and using a commercially available apparatus.

<Polyether Resin (B2)>

As for the polyether resin (B2), any of polyether resins recited for the polyether resin (B) may be used as long as HLB calculated by the Griffin method is from 8 to 20.

As HLB of the polyether resin (B2) is higher relative to the lower limit value, the hydrophilicity tends to be increased; reducing the dispersed particle diameter; and providing stable dispersion, and as HLB is lower relative to the upper limit value, the surface energy of the aqueous resin dispersion tends to be reduced, leading to good wettability. The HLB of the polyether resin (B2) is preferably from 10 to 20, and more preferably from 12 to 20.

The polyether resin (B2) for use in the present invention preferably has a weight average molecular weight [Mw] of 200 to 200,000 in measurement by GPC and converted with using a calibration curve of a polystyrene. It is preferable that the lower limit value of Mw is 300; and 500 is more preferable, and it is preferable that the upper limit value of Mw is 100,000; 10,000 is more preferable; and 3,000 is still more preferable.

As Mw is higher relative to the lower limit value above, the hydrophilicity tends to be increased, reducing the dispersed particle diameter and providing stable dispersion, and as Mw is lower relative to the upper limit value above, the viscosity tends to be lower, making it easy to prepare the resin dispersion. Here, the GPC measurement is performed by a conventionally known method by using THF, etc. as a solvent and using a commercially available apparatus.

<Bonding Amount of Polyether Resin (B)>

The polymer (C) according to the present invention is preferably produced by bonding of the polyolefin (A) and the polyether resin (B) in a ratio of polyolefin (A):polyether resin (B)=100:1 to 100:100 (weight ratio). This weight ratio is more preferably from 100:5 to 100:70, and still more preferably from 100:10 to 100:50. Within this range, a stable resin dispersion having good hydrophilicity and a small dispersed particle diameter is readily obtained and in addition, the adherence to the polyolefin substrate tends to increase.

The amount of the polyether resin (B1) bonded to the polyolefin (A) is preferably from 1 to 50 parts by weight per 100 parts by weight of the polyolefin (A). It is more preferable that the lower limit value of the bonding amount of the polyether resin (B1) is 3 parts by weight; 5 parts by weight is still more preferable, and it is more preferable that the upper limit value is 45 parts by weight; and 40 parts by weight is still more preferable.

As the bonding amount of the polyether resin (B1) is higher relative to the lower limit value above, the surface energy of the aqueous resin dispersion tends to be reduced, leading to good wettability, and as the bonding amount is lower relative to the upper limit value above, the stability of the aqueous resin dispersion tends to increase.

The amount of the polyether resin (B2) bonded to the polyolefin (A) is preferably from 1 to 50 parts by weight per 100 parts by weight of the polyolefin (A). It is more preferable that the lower limit value of the bonding amount of the polyether resin (B2) is 2 parts by weight; and 4 parts by weight is still more preferable, and it is more preferable that the upper limit value is 30 parts by weight; and 20 parts by weight is still more preferable.

As the bonding amount of the polyether resin (B2) is higher relative to the lower limit value above, the hydrophilicity tends to be increased, reducing the dispersed particle diameter and providing stable dispersion, and as the bonding amount is lower relative to the upper limit value above, the adherence to the crystalline polyolefin as a substrate tends to increase.

In the present invention, in order to more effectively obtain the effect due to containing both the polyether resin (B1) and the polyether (B2) as the polyether resin (B), the ratio of the polyether resin (B1) to the polyether (B) bonded to the polyolefin (A), i.e., to the total of the polyether resin (B1) and the polyether resin (B2), is preferably from 1 to 95 wt %, and particularly preferably from 10 to 90 wt %.

The polyether resin (B1) and the polyether resin (B2) preferably differ in their HLB by 8 or more, and particularly preferably by approximately from 12 to 16.

[Polymer (C)]

The polymer (C) produced by bonding the polyether resin (B) to the polyolefin (A) may be a graft copolymer where the polyether resin (B) is graft-bonded to the polyolefin (A), or a block copolymer of the polyether (B) and the polyolefin (A), encompassing the state of the polyether resin (B) being bonded to one terminal or both terminals of the polyolefin (A), and the former graft copolymer is preferred.

The graft copolymer where the polyether resin (B) is graft-bonded to the polyolefin (A) is advantageous in that the content of the polyether resin (B) is easy to control and in addition, the content of the polyether (B) is likely to be increased, compared with the block copolymer.

The polyether resin (B) can be bonded to the polyolefin (A) by using various reaction modes. Although the reaction mode is not particularly limited, it includes, for example, a radical graft reaction and a reaction utilizing a reactive group. According to the radical graft reaction, bonding by a carbon-carbon covalent bond is formed.

In the reaction utilizing a reactive group, both the polyolefin (A) and the polyether resin (B) have a reactive group, and these are bonded by reacting the reactive groups, where a covalent bond or an ionic bond is formed. This reaction includes, for example, an esterification reaction of a carboxylic acid group and a hydroxyl group, a ring-opening reaction of a carboxylic acid group and an epoxy group, a ring-opening reaction of a primary or secondary amino group and an epoxy group, an amidation reaction of a carboxylic acid group and a primary or secondary amino group, a quaternary ammonium-forming reaction of a carboxylic acid group and a tertiary amino group, a urethanation reaction of a carboxylic acid group and an isocyanate group, and a urethanation reaction of a primary or secondary amino group and an isocyanate group.

The reaction ratio in each reaction may be arbitrarily selected in the range of 1 to 100% and is preferably from 50 to 100%; and more preferably from 70 to 100%. In the case where the carboxylic acid group is a dibasic acid or its anhydride, one equivalent or two equivalents of a reactive group may be reacted per one equivalent of a dibasic acid or its anhydride.

The method for producing the polymer (C) by bonding the polyolefin (A) and the polyether resin (B) usually includes (R1) a method of polymerizing a hydrophilic monomer in the presence of a polyolefin (A) to form a polyether resin (B) bonded to the polyolefin (A), and (R2) a method of bonding a previously polymerized polyether resin (B) to a polyolefin (A). In either method, a polyolefin (A1) having no reaction group or a polyolefin (A2) having a reaction group can be used as the polyolefin (A).

<Production Method (R1) of Polymer (C)>

In this method, a hydrophilic monomer for forming the polyether resin (B) is polymerized in the presence of a polyolefin (A), whereby a polyether resin (B) bonded to the polyolefin (A) is obtained. The polymerization method for the hydrophilic monomer includes, for example, addition polymerization, condensation polymerization, and ring-opening polymerization. At this time, a hydrophobic monomer may be copolymerized to an extent that the polyether resin (B) can be formed after the polymerization.

Specifically, there is, for example, a method where the polyether resin (B) is formed and at the same time, bonded to the polyolefin (A) by polymerizing a hydrophilic radical polymerizable unsaturated compound in the presence of a radical polymerization initiator. In this case, as to the polyolefin (A), although a polyolefin (A2) having a reactive group may be used, a polyolefin (A1) having no reactive group is usually used.

Although the hydrophilic radical polymerizable unsaturated compound is not particularly limited, it includes, for example, (meth)acrylic acid, hydroxyethyl (meth)acrylate, methoxypolyethylene glycol (meth)acrylate, dimethylaminoethyl (meth)acrylate, quaternized dimethylaminoethyl (meth)acrylate, and vinylpyrrolidone. The copolymerizable hydrophobic monomer includes, for example, (meth)acrylic acid esters such as methyl (meth)acrylate and butyl (meth)acrylate, and vinyl acetate.

There is also a method where a polymer is formed and at the same time, bonded to the polyolefin (A) by polymerizing a radical polymerizable unsaturated compound in the presence of a radical polymerization initiator and the polymer is subsequently modified to provide the polyether resin (B). The method includes, for example, a method where tert-butyl (meth)acrylate is polymerized and then converted to a poly(meth)acrylic acid through hydrolysis under acidic conditions, and a method where vinyl acetate is polymerized and then modified to a polyvinyl alcohol through saponification.

The copolymerizable hydrophobic monomer includes, for example, (meth)acrylic acid esters such as methyl (meth)acrylate and butyl (meth)acrylate, and vinyl acetate. In this case, as to the polyolefin (A), although a polyolefin (A2) having a reactive group may be used, a polyolefin (A1) having no reactive group is usually used.

The method also includes, for example, a method where a polyolefin (A2) having a reactive group is used and using this reactive group as an initial terminal, a hydrophilic radical polymerizable unsaturated compound, a hydrophilic ring-opening polymerization monomer, etc. is polymerized to obtain the polyether resin (B). As the hydrophilic radical polymerizable unsaturated compound, those described above can be used in the same manner.

The hydrophilic ring-opening polymerization monomer includes, for example, ethylene oxide and ethyleneimine The copolymerizable hydrophobic monomer includes, for example, trimethylene oxide, tetrahydrofuran, β-propiolactone, γ-butyrolactone, and ε-caprolactone.

As for all of these monomers, one monomer may be used alone, or two or more monomers may be used in combination.

The reaction method is not particularly limited and may be any method as long as a polymer (C) satisfying the requirements of the present invention can be produced. The method includes, for example, a method involving heating and stirring to cause a reaction in a solution, a method involving melting, heating and stirring to cause a reaction in the absence of a solvent, and a method involving heating and kneading to cause a reaction in an extruder.

The reaction temperature is usually from 0 to 200° C., preferably from 30 to 150° C. As to the solvent in the case of producing the polymer in a solution, the solvents recited as the solvent used in the production of the polyolefin (A1) may be used in the same manner.

<Production Method (R2) of Polymer (C)>

In this method, a previously polymerized polyether resin (B) is bonded to the polyolefin (A). In this case, as to the polyether resin (B), those recited in the description of the polyether (B) above may be used.

Specifically, the method includes, for example, a method where a hydrophilic monomer is first polymerized to produce a polyether resin, by allowing an unsaturated double bond to leave in the molecule, and the resin is then graft-polymerized to the polyolefin (A) by using a radical polymerization initiator. In this case, as to the polyolefin (A), although a polyolefin (A2) having a reactive group may be used, a polyolefin (A1) having no reactive group is usually used.

The method also includes, for example, a method where a polyether resin (B) having a reactive group at a terminal is first produced and then bonded to a polyolefin (A2) having a reactive group. The polyether resin having a reactive group at a terminal is obtained by polymerization of a hydrophilic monomer with use of a reactive group-containing compound as an initiator or a chain transfer agent or is obtained by ring-opening polymerization of a hydrophilic ring-opening polymerization monomer such as epoxy compound.

As to the hydrophilic monomer that can be used here, various hydrophilic monomers recited in <Production Method (R1) of Polymer (C)> may be used in the same manner. As for all of these monomers, one monomer may be used alone, or two or more monomers may be used in combination.

The reaction method is not particularly limited and may be any method as long as a polymer (C) satisfying the requirements of the present invention can be produced. The method includes, for example, a method involving heating and stirring to cause a reaction in a solution, a method involving melting, heating and stirring to cause a reaction in the absence of a solvent, and a method involving heating and kneading to cause a reaction in an extruder.

The reaction temperature is usually from 0 to 200° C., preferably from 30 to 150° C. As to the solvent in the case of producing the polymer in a solution, the solvents recited as the solvent used in the production of the polyolefin (A1) may be used in the same manner.

The polymer (C) produced by the method above can be confirmed according to the following method to be a polymer in which a polyolefin (A) and a polyether resin (B) are bonded and the polyether resin (B) contains a polyether resin (B1) having an HLB of less than 8 and a polyether resin (B2) having an HLB of 8 to 20, according to calculation by the Griffin method.

Namely, the polymer C is dissolved in a solvent such as toluene, benzene or xylene and after adding sodium hydroxide and water thereto, the resulting solution is stirred at 80 to 100° C. to cause a hydrolysis reaction and dissociate the polyether resin (B) from the polymer (C). Next, the polyolefin (A) after dissociation of the polyether resin (B) of the polymer C is removed by reprecipitation in a solvent such as acetone, methyl ethyl ketone, diethyl ketone or methyl isobutyl ketone.

The method for separating the polyether resin (B) into a polyether resin (B1) and a polyether resin (B2) includes, for example, a method of fractionating the resin by reverse-phase liquid chromatography and separately collecting respective fractions. The analysis conditions can be appropriately determine by one skilled in the art.

The structures of the polyether resin (B1) and the polyether resin (B2) can be determined as follows, and HLB can be calculated by the Griffin method. More specifically, the molecular weight and constituent units are detected and measured using a mass spectrum, the structure is detected and measured with using $^1$H and $^{13}$C-NMR, and the structures of the polyether resin (B1) and the polyether resin (B2) are identified based on these measurement results.

[Aqueous Resin Dispersion of Polymer (C)]

Although the method for producing the aqueous resin dispersion of the present invention, which is an aqueous resin dispersion of the polymer (C), is not particularly limited it includes, for example, a method where a solvent except for water is added to the polymer (C) and after the mixture is, if desired, heated and dissolved, water is added thereto to form a dispersion, and a method where the polymer (C) is melted at a temperature not less than the temperature for melting the polymer and water is added thereto to form a dispersion. The former method is preferred.

An aqueous resin dispersion having a small particle diameter is readily prepared in the method where a solvent except for water is added to the polymer (C) and after the mixture is, if desired, heated and dissolved, water is added. The temperature at the time of dissolution or addition of the polymer (C) into a solvent is usually from 30 to 150° C.

It is also possible to once dissolve the polymer (C) in a solvent except for water and after adding water thereto, remove the solvent by distillation. The ratio of the solvent except for water to all solvents in the aqueous resin dispersion is, finally, usually 50 wt % or less; 20 wt % or less is preferable; 10 wt % or less is more preferable; and 1 wt % or less is particularly preferable.

The solvent except for water, used in this method, includes, for example, an aromatic hydrocarbon such as toluene, xylene and tert-butylbenzene, an aliphatic hydrocarbon such as hexane, octane and decane, an alicyclic aliphatic hydrocarbon such as cyclohexane and methylcyclohexane, a halogenated hydrocarbon such as methylene chloride, carbon tetrachloride and chlorobenzene, esters such as methyl acetate, ethyl acetate, propyl acetate and butyl acetate, ketones such as acetone, methyl ethyl ketone, methyl propyl ketone, methyl isobutyl ketone and cyclohexanone, alcohols such as methanol, ethanol, n-propanol, isopropanol, n-butanol, 2-butanol, isobutanol, tert-butanol, cyclohexanol, ethylene glycol, propylene glycol and butanediol, ethers such as dipropyl ether, dibutyl ether and tetrahydrofuran, an organic solvent having two or more functional groups, such as 2-methoxyethanol, 2-ethoxyethanol, 2-butoxyethanol, 2-methoxypropanol, 2-ethoxypropanol and diacetone alcohol, and polar solvents such as dimethylformamide and dimethylsulfoxide. One of these may be used alone, or two or more thereof may be used in combination.

Among these, a solvent dissolving, in water, in an amount of 1 wt % or more is preferred, and a solvent dissolving in an amount of 5 wt % or more is more preferred. For example, methyl ethyl ketone, cyclohexanone, n-propanol, isopropanol, n-butanol, 2-butanol, isobutanol, tert-butanol, cyclohexanol, tetrahydrofuran, 2-methoxyethanol, 2-ethoxyethanol, 2-butoxyethanol, 2-methoxypropanol, and 2-ethoxypropanol are preferred.

Although the apparatus for producing the aqueous resin dispersion by adding water after providing a state of the polymer (C) being dissolved in a solvent or melted is not particularly limited, it includes, for example, a reactor equipped with a stirring device, and a single-screw or twin-screw kneader. At this time, the stirring speed varies to some extent depending on the apparatus selected but is usually from 10 to 1,000 rpm.

The polymer (C) (resin) for use in the present invention is very excellent in dispersibility in water and therefore advantageous in that the aqueous resin dispersion of the polymer (C) has a small dispersed particle diameter and the resin is stably dispersed, and a coated article having an excellent exterior appearance can be obtained by using this aqueous resin dispersion of the present invention.

The dispersed particle diameter of the polymer (resin) (C) in the aqueous resin dispersion of the present invention is, in terms of the 50% particle diameter $D_{50}$, usually 5.0 µm or less; and 1.0 µm or less is preferable. According to the present invention, the 50% particle diameter $D_{50}$ can be made to be 0.5 µm or less and 0.3 µm or less is preferable. Making the dispersed particle diameter of the polymer (C) small enables to enhance the dispersion stability, decrease the occurrence of aggregation and form a more stable aqueous resin dispersion.

The dispersion as used in the present invention is a concept including a state where dispersed particles are very small and dispersed in a monomolecular fashion, i.e., a state which can be regarded as a substantially dissolved state. Accordingly, the lower limit value of the dispersed particle size is not particularly limited.

It is preferable that the solid content in the aqueous resin dispersion of the present invention is 5 wt % or more; 10 wt % or more is more preferable; and 20 wt % or more is still more preferable, and 70 wt % or less is preferable; 60 wt % or less is more preferable; and 50 wt % or less is still more preferable. As the solid content is smaller, the stability of the resin dispersion tends to be higher. However, for example, at the time of use as a primer or an adhesive, the solid content is preferably high so as not to spend a lot of energy and time drying water after coating.

According to the polymer (C) used in the present invention, as described above, an aqueous resin dispersion can be obtained by using substantially no surfactant and consequently, it is one of the advantages of the aqueous resin dispersion obtained using the polymer that bleed-out having been conventionally caused by a surfactant can be suppressed.

However, according to necessity depending on other purposes, uses, etc., a surfactant may be contained in the aqueous resin dispersion of the present invention. The surfactant includes, for example, a cationic surfactant, an anionic surfactant, a nonionic surfactant, an amphoteric surfactant, and a reactive surfactant.

The nonionic surfactant includes, for example, polyoxyethylene cetyl ether, polyoxyethylene stearyl ether, polyoxyethylene nonyl phenyl ether, and polyoxyethylene sorbitan monolaurate.

The anionic surfactant includes, for example, sodium dodecylbenzenesulfonate, sodium sulfosuccinate, sodium laurylsulfate, and sodium polyoxyethylene laurylether sulfate.

The cationic surfactant includes, for example, stearyltrimethylammonium chloride and cetyltrimethylammonium bromide. The amphoteric surfactant includes, for example, lauryl dimethylaminosuccinic acid betaine.

In addition, as the surfactant above, for example, a so-called reactive surfactant having a radical polymerizable functional group may be used, and when a reactive surfactant is used, the water resistance of the coated film can be enhanced. Typical commercially available reactive surfactants include, for example, Eleminol JS-2 (produced by Sanyo Chemical Industries, Ltd.) and Latemul S-180 (produced by Kao Corporation).

In the case where the aqueous resin dispersion of the present invention contains a surfactant, it is preferable that the content of the surfactant is usually 20 parts by weight or less; 10 parts by weight or less is more preferable; and 5 parts by weight or less is still more preferable, per 100 parts by weight of the polymer (C), and it is most preferable to contain substantially no surfactant.

Although the aqueous resin dispersion of the present invention may be sufficient if it contains water as a dispersion medium and/or a solvent, other dispersion mediums and/or solvents may also be contained.

Other dispersion mediums and/or solvents are not particularly limited, and one member or two or more members of the solvents recited as the solvent except for water at the time of production of an aqueous dispersion of the polymer (C) may be used. Among others, a solvent soluble in water in an amount of 5 wt % or more is preferred, and a solvent soluble in an amount of 10 wt % or more is more preferred.

For example, cyclohexanone, n-propanol, isopropanol, n-butanol, 2-butanol, tert-butanol, tetrahydrofuran, 2-methoxyethanol, 2-ethoxyethanol, 2-butoxyethanol, 2-methoxypropanol, and 2-ethoxypropanol are preferred.

For example, in the case of using the aqueous resin dispersion of the present invention for applications such as primer, coating material or ink, a hydrophilic organic solvent except for water may be blended for the purpose of enhancing the drying speed or obtaining a surface with good finishing. The hydrophilic organic solvent includes, for example, alcohols such as methanol and ethanol, ketones such as acetone, glycols such as ethylene glycol and propylene glycol, and ethers thereof.

The ratio of other dispersion mediums and/or solvent in dispersion mediums and/or solvents including water is usually 50 wt % or less, and 30 wt % or less is preferable; and 20 wt % or less is more preferable.

In the aqueous resin dispersion of the present invention, an acidic substance or a basic substance may be added, if desired. The acidic substance includes, for example, an inorganic acid such as hydrochloric acid and sulfuric acid, and an organic acid such as acetic acid. The basic substance includes, for example, an inorganic base such as sodium hydroxide and potassium hydroxide, ammonia, triethylamine, diethylamine, dimethylamine, 2-methyl-2-amino-propanol, and triethanolamine.

For example, it is preferable to add a basic substance when the polymer (C) has an acidic group and to add an acidic substance when the polymer (C) has a basic group, and the addition in this way is advantageous in that the hydrophilicity of the polymer (C) can be increased and the dispersed particle diameter can be made smaller.

In the aqueous resin dispersion of the present invention, various additives may be incorporated, if desired, to the extent that the effects of the present invention are not significantly impaired. For example, various stabilizers such as ultraviolet absorber, antioxidant, weather-resistant stabilizer and heat-resistant stabilizer, and various additives, e.g., a coloring agent such as dye, organic pigment and inorganic pigment, an electroconductivity-imparting agent such as carbon black and ferrite, a pigment dispersant, a leveling agent, a defoaming agent, a thickener, an antiseptic, a fungicide, an anti-rust agent and a wetting agent, may be blended and used.

The defoaming agent includes, for example, "SURFYNOL 104PA" and "SURFYNOL 440" produced by Air Products and Chemicals, Inc.

In order to further enhance various coating film performances such as water resistance and solvent resistance, a crosslinking agent may be added in an amount of 0.01 to 100 parts by weight per 100 parts by weight of the polymer (C) of the aqueous resin dispersion. The crosslinking agent includes, for example, a crosslinking agent having a self-crosslinking property, a compound having, in the molecule, a plurality of functional groups capable of reacting with a carboxylic acid group, and a metal complex having a polyvalent coordination position.

Among these, an isocyanate compound, a melamine compound, a urea compound, an epoxy compound, a carbodiimide compound, an oxazoline group-containing compound, a zirconium salt compound, a silane coupling agent, etc. are preferred. In addition, these crosslinking agents may be used in combination.

In the aqueous resin dispersion of the present invention, a water-soluble resin or a resin capable of dispersing in water, except for the polymer (C), may be mixed, if desired, to the extent that the effects of the present invention are not significantly impaired, and blending of such another resin is effective, for example, in enhancing the coating exterior appearance (glazing or delustering) or reducing the tackiness. This resin may be a resin that can be dispersed by using a surfactant.

As to the water-soluble resin, for example, the resins recited as the polyether (B) may be used. For example, an aqueous solution prepared by dissolving such a resin in water may be used by mixing it with the aqueous resin dispersion of the present invention.

The resin capable of dispersing in water includes, for example, an acrylic resin, a polyester resin, a polyurethane resin, an epoxy resin, a vinyl ester resin, a melamine resin, and an alkyd resin. The form of the aqueous resin dispersion containing such a resin and the polymer (C) is not particularly limited. For example, there is a method where such a resin and the polymer (C) are individually emulsified and mixed. In this method, an aqueous resin dispersion in which a particle composed of such a resin and a particle composed of the polymer (C) are separately formed and dispersed in water, is obtained.

Alternatively, there is a method where such a resin and the polymer (C) are mixed and then emulsified. In this method, an aqueous resin dispersion in which particles in the state of such a resin and the polymer (C) being mixed in one particle are dispersed in water, is obtained. For example, by allowing the polymer (C) to coexist at the time of polymerization of the resin, both can be mixed, and by emulsifying/dispersing the mixture in water, particles containing the resin and the polymer (C) in one particle can be formed.

In addition, by performing melt-kneading, etc. after separately synthesizing the resin and the polymer (C), both can be mixed, and by emulsifying/dispersing the mixture in water, particles containing the resin and the polymer (C) in one particle can be formed.

In order for the polymer (C) and the resin to effectively exert respective properties, an aqueous resin dispersion in which a particle composed of the polymer (C) and a particle composed of the resin are separately present, is preferred. Such an aqueous resin dispersion is obtained, for example, by mixing a dispersion including the polymer (C) emulsified/dispersed in water and a dispersion including the resin emulsified/dispersed in water.

In the case of mixing another resin, the weight ratio of the total amount of the polymer (C) and another resin to water is preferably from 5:95 to 60:40. That is, assuming that the gross weight of the polymer (C), another resin and water is 100 parts by weight, the total amount of the polymer (C) and another resin is preferably from 5 to 60 parts by weight.

When this ratio is 5 parts by weight or more, the workability such as coating or heating/curing is enhanced. It is preferable that the ratio is 10 parts by weight or more; and 15 parts by weight or more is more preferable. On the other hand, when the ratio is 60 parts by weight or less, the viscosity of the aqueous resin dispersion can be prevented from becoming too high, and good coatability is obtained, making it easy to form a uniform coating film. It is preferable that the ratio is 55 parts by weight or less; and 50 parts by weight or less is more preferable.

The weight ratio of the polymer (C) to another resin is preferably from 90:10 to 10:90. That is, assuming that the total amount of the polymer (C) and another resin is 100 parts by weight, the amount of the polymer (C) is preferably from 10 to 90 parts by weight.

When the amount of the polymer (C) is 10 parts by weight or more, sufficient adherence to a polyolefin-based substrate is obtained. It is preferable that the amount of the polymer (C) is 15 parts by weight or more; and 20 parts by weight or more is more preferable.

When the amount of the polymer (C) is 90 parts by weight or less, the effect due to use of another resin in combination can be fully obtained, and the effect of improving physical properties of a coating film obtained from such a composite aqueous resin dispersion, specifically, the strength, water resistance, weather resistance, abrasion resistance, solvent resistance, etc. of the coating film, can be sufficiently obtained. It is preferable that the amount of the polymer (C) is 85 parts by weight or less; and 80 parts by weight or less is more preferable.

The method for isolating the polymer (C) from the aqueous resin dispersion of the present invention includes, for example, the following method. That is, a solvent such as toluene, hexane or benzene is added dropwise to the aqueous resin dispersion, and the polymer C is dissolved in the solvent by stirring at 60 to 80° C. Subsequently, the solvent having dissolved therein the polymer C is subjected to oil phase separation. The polymer C is re-precipitated by adding a solvent such as acetone, methyl ethyl ketone, diethyl ketone or methyl isobutyl ketone to the obtained solution and can thereby be isolated.

A pigment may be added to the aqueous resin dispersion of the present invention. The aqueous resin dispersion containing a pigment is preferred as a coating material.

The pigment that can be used is not particularly limited and includes, for example, a coloring pigment, e.g., an inorganic pigment such as titanium oxide, carbon black, iron oxide, chromium oxide, Prussian blue, red oxide, chrome yellow and yellow iron oxide, and an organic pigment such as azo-based pigment, anthracene-based pigment, perynone-based pigment, perylene-based pigment, quinacridone-based pigment, isoindolinone-based pigment, indigo-based pigment and phthalocyanine-based pigment; an extender pigment such as talc, calcium carbonate, clay, kaolin, silica and precipitated barium sulfate; a conductive pigment such as whisker coated with conductive carbon or antimony-doped tin oxide; and a colorless or colored metal glitter, e.g., a metal, an alloy or a metal oxide, such as aluminum, copper, zinc, nickel, tin or aluminum oxide. One of these pigments may be used alone, or two or more thereof may be used in combination.

In the case where the aqueous resin dispersion of the present invention contains a pigment, it is preferable that the content of the pigment is 10 parts by weight or more; and 50 parts by weight or more is more preferable, per 100 parts by weight of the resin (the total amount of the polymer (C) and another resin used, if desired). However, it is preferable that the content is 400 parts by weight or less, and 200 parts by weight or less is more preferable. As the amount of the pigment added is larger relative to the lower limit value above, the color-forming and hiding properties tend to be higher, and as the amount is lower relative to the upper limit value, the adhesion, moisture resistance and oil resistance tend to be higher.

In the case where the aqueous resin dispersion of the present invention contains a pigment, a pigment dispersant may be used. The pigment dispersant includes, for example, an aqueous acrylic resin such as JONCRYL resin produced by Johnson Polymer Corporation; an acidic block copolymer such as BYK-190 produced by BYK-Chemie; a styrene-maleic acid copolymer; an acetylene diol derivative such as SURFYNOL T324 produced by Air Products and Chemicals, Inc.; a water-soluble carboxymethyl acetate butyrate such as CMCAB-641-0.5 produced by Eastman Chemical Company. By using such a pigment dispersant, a stable pigment paste can be prepared.

The aqueous resin dispersion of the present invention can be used for a primer, a primerless coating material, an adhesive, an ink, etc. In particular, the present invention is preferably used as a primer, a coating material or an adhesive, more preferably as a primer, coating material or adhesive for a polyolefin substrate. Specific uses include, for example, a coating material or primer for automobiles such as automotive interior and exterior, a coating material for home electronics such as mobile phone and personal computer, and a coating material for building materials.

[Laminate]

The aqueous resin dispersion of the present invention or a coating material containing the dispersion may be applied onto a substrate and heated to form a resin layer and thereby provide a laminate.

As the substrate of the laminate of the present invention, a thermoplastic resin molding is preferred. The thermoplastic resin molding is not particularly limited and includes, for example, a polyolefin resin, a polyamide resin, a polyethylene terephthalate resin, a polybutylene terephthalate resin, an unsaturated polyester resin, and a polycarbonate resin. Among others, the present invention is preferably applied to a thermoplastic resin molding composed of a polyolefin resin, more preferably applied to a thermoplastic resin molding composed of a propylene-based polymer.

The olefin-based polymer as the substrate includes, for example, an olefin-based polymer such as high pressure process polyethylene, medium or low pressure process polyethylene, polypropylene, poly-4-methyl-1-pentene, poly-1-butene and polystyrene, and an olefin copolymer such as ethylene-propylene copolymer, ethylene-butene copolymer and propylene-butene copolymer. In addition, the molding may be, for example, a molding composed of polypropylene and synthetic rubber.

The shape of the substrate is not particularly limited and includes, for example, a film shape, a sheet shape, a plate shape, and other irregular shapes.

The substrate to which the aqueous resin dispersion of the present invention or a coating material containing the dispersion is applied may be a substrate formed by any known molding method such as injection molding, compression molding, blow molding, extrusion molding or rotation molding.

According to the aqueous resin dispersion of the present invention or a coating material containing the dispersion, even when an inorganic filler such as talc, zinc white, glass fiber, titanium white or magnesium sulfate, a pigment, etc., is blended in the substrate, a coating film with good adherence can be formed.

The method for forming a resin layer on a substrate by using the aqueous resin dispersion of the present invention or a coating material containing the dispersion is not particularly limited, and a known method can be used. The coating method includes, for example, various coating methods such as spray coating, bar coating, spin coating, dip coating (immersion coating) and gravure coating. In general, coating by spray coating is performed on a large size molding such as automotive bumper or home electronics, and coating by gravure coating or bar coating is performed on a plastic film or sheet.

After applying the aqueous resin dispersion of the present invention or a coating material containing the dispersion, the coating film is usually cured by heating with a nichrome wire, an infrared ray or a radiofrequency wave, and a laminate having a desired coating film on the surface can thereby be obtained. The conditions for curing the coating film are appropriately selected according to the material or shape of the substrate, the composition of the coating material used, etc. The curing temperature is not particularly limited but in consideration of practical utility, is usually 50° C. or more; and 60° C. or more is preferable. However, the curing temperature is usually 150° C. or less and 130° C. or less is preferable.

The thickness (after curing) of the resin layer laminated is appropriately selected according to the material or shape of the substrate, the composition of the coating material used, the usage of the laminate, etc. and it is usually 0.1 µm or more; 1 µm or more is preferable; and 5 µm or more is more preferable. However, the thickness is usually 500 µm or less; 300 µm or less is preferable; 200 µm or less is more preferable; and 100 µm or less is particularly preferable.

The laminate of the present invention can be used for various industrial components such as automobile, home electronics or building material and has a practically sufficient performance as a thin-walled, highly functionalized or large-sized component/material. The laminate can be used, for example, as a molding material for various industrial components, e.g., an automotive component such as bumper, instrument panel, trim and garnish, a home electronic device component such as TV casing, washing machine basin, refrigerator component, air conditioner component and cleaner component, a toiletry component such as toilet sheet, toilet sheet cover and water tank, and a component around a bathroom, such as bathtub, wall and ceiling of bathroom, and drainage pan.

EXAMPLES

Although the present invention is described in greater detail by referring to Examples, the present invention is by no means limited to the following Examples as long as the gist of the present invention is observed.

[Measuring Method and Evaluation Method of Physical Properties]

(1) Weight Average Molecular Weight [Mw] and Molecular Weight Distribution [Mw/Mn](1)-1 Measuring Method of Molecular Weight in Terms of Polypropylene Into a 30 ml vial, 20 mg of a sample was collected, and 20 g of o-dichlorobenzene containing 0.04 wt % of dibutylhydroxytoluene as a stabilizer was added thereto. Using an oil bath heated at 135° C., the sample was dissolved and then subjected to thermal filtration through a polytetrafluoroethylene (PTFE) filter having a pore size of 3 µm to prepare a sample solution having a polymer concentration of 0.1 wt %.

Next, GPC measurement was performed using GPC150CV manufactured by Waters, which is attached with TSKgel GM H-HT (30 cm×4 columns) as a column and an RI detector. The measurement conditions used were an injection amount of sample solution: 500 µl, a column temperature: 135° C., a solvent: o-dichlorobenzene, and a flow rate: 1.0 ml/min.

At the time of calculation of the molecular weight, a commercially available monodisperse polystyrene was used as a standard sample and by preparing a calibration curve relating to the holding time and the molecular weight from the viscosity equation of the polystyrene standard sample and a polypropylene, the molecular weight of the propylene polymer was calculated.

A viscosity equation of $[\eta]=K \cdot M^{\alpha}$ was used, wherein $K=1.38E-4$ and $\alpha=0.70$ for the polystyrene and $K=1.03E-4$ and $\alpha=0.78$ for the propylene-$\alpha$-olefin copolymer.

From the obtained values of weight average molecular weight [Mw] and number average molecular weight [Mn], the molecular weight distribution [Mw/Mn] was calculated.

(1)-2 Measuring Method of Molecular Weight in Terms of Polystyrene

Into a 10 ml vial, 5 mg of a sample was collected and after adding 5 g of tetrahydrofuran containing 250 ppm of butylhydroxytoluene as a stabilizer, completely dissolved at 50° C. The resulting solution was cooled to room temperature and then filtered through a filter having a pore size of 0.45 µm to prepare a sample solution having a polymer concentration of 0.1 wt %.

Next, GPC measurement was performed using GPC HLC-8020 manufactured by Tosoh Corporation, in which a guard column TSKguardcolumn $H_{XL}$-H is attached to TSKgel $GMH_{XL}$-L (30 cm×2 columns) as a column. The measurement conditions used were an injection amount of sample solution: 50 µl, a column temperature: 40° C., a solvent: tetrahydrofuran, and a flow rate: 1.0 ml/min.

At the time of calculation of the molecular weight, a commercially available monodisperse polystyrene standard sample was measured as a standard sample and by preparing a calibration curve from the holding time and the molecular weight of the standard sample, the molecular weight was calculated.

From the obtained values of weight average molecular weight [Mw] and number average molecular weight [Mn], the molecular weight distribution [Mw/Mn] was calculated.

(2) Graft Ratio

Into a 10 ml sample bottle, 200 mg of a polymer and 4,800 mg of chloroform were put and completely dissolved by heating at 50° C. for 30 minutes. Chloroform was put into a liquid cell using NaCl as its material and having an optical path length of 0.5 mm and used as a background. Next, the dissolved polymer solution was put into the liquid cell and using FT-IR460plus manufactured by JASCO Corporation, the infrared absorption spectrum was measured by a number of scans of 32.

The graft ratio of maleic anhydride was calculated using a calibration curve prepared by measuring a solution including chloroform having dissolved therein maleic anhydride. Then, the content of an acid component in the polymer was calculated from the area of the absorption peak of a carbonyl group (maximum peak near 1,780 cm$^{-1}$: from 1,750 to 1,813 cm$^{-1}$) based on a calibration curve separately prepared and was taken as the graft ratio (wt %).

(3) Dispersed Particle Diameter

Measurement was carried out by using Microtrac UPA (Model 9340, batch type, dynamic light scattering method/laser Doppler method) manufactured by Nikkiso Co., Ltd. The particle diameter was measured under the conditions that the density of the aqueous resin dispersion was 0.87 kg/m$^3$, the shape of the dispersed particle was spherical, the dispersion medium was water, the refractive index of the dispersion medium was 1.33, and the measurement time was 180 seconds, and the 50% particle diameter D$_{50}$ accumulated from the small particle diameter side on a volume basis was determined.

(4) Evaluation of Blocking Resistance

The aqueous resin dispersion produced was applied by means of Mayer bar (#20) onto a polypropylene film (thickness: 60 μm) having a corona-treated surface and dried at 100° C. for 2 minutes to manufacture an aqueous resin dispersion-coated polypropylene film.

This film was combined with an aqueous resin dispersion-coated polypropylene film manufactured in the same manner, by arranging the coated surfaces to overlap and face each other at a temperature of 50° C. and a humidity of 95% under a load of 0.1 kg/cm$^2$ for 24 hours. Next, this specimen was sheared to a width of 15 mm and subjected to a 90° peeling test in a FUDOU rheometer (manufactured by Rheotech) to measure the peeling strength. The measurement was performed in an atmosphere of a temperature of 23° C. and a humidity of 65% at a tensile speed of 50 mm/min. It is preferable that the peeling strength is 10 gf/15 mm or less.

(5) Contact Angle

With respect to the aqueous resin dispersion produced, the contact angles on a polypropylene film (CPP), a polyethylene terephthalate film (PET) and an aluminum foil (Al) were measured using a contact angle meter (DropMaster DM500, manufactured by Kyowa Interface Science Co., Ltd). It is preferable that the contact angle on CPP is 70° or less; the contact angle on PET is 40° or less; and the contact angle on Al is 80° or less.

[Polyether Resin (B)]

As the polyether resin (B), a polyether amine shown below of "Jeffamine" M series produced by Huntsman Corporation was used.

TABLE 1

$$H_2N \left[ X \diagdown O \right]_n \left[ Y \diagdown O \right]_m R \quad (1)$$

|  | X | n | Y | m | R | Weight Average Molecular Weight [Mw] | HLB |
|---|---|---|---|---|---|---|---|
| M-600 | C$_3$H$_6$ | 9 | C$_2$H$_4$ | 1 | CH$_3$ | 600 | 2.0 |
| M-1000 | C$_3$H$_6$ | 3 | C$_2$H$_4$ | 19 | CH$_3$ | 1000 | 17.0 |
| M-2005 | C$_3$H$_6$ | 29 | C$_2$H$_4$ | 6 | CH$_3$ | 2000 | 2.8 |

Production Example 1

Production and Evaluation of Maleic Anhydride-Modified Propylene-Based Copolymer By a supermixer, 200 kg of "TAFMER XM-7070" (produced by Mitsui Chemicals Inc., melting point: 75° C., propylene content: 74 mol %, weight average molecular weight [Mw] 250,000 (in terms of polypropylene), molecular weight distribution [Mw/Mn]: 2.2) that is a propylene-butene copolymer polymerized using a metallocene catalyst, and 5 kg of maleic anhydride were dry-blended.

Thereafter, the blend was kneaded using a twin-screw extruder ("TEX54αII", manufactured by The Japan Steel Works, Ltd.) under the conditions of a cylinder temperature in kneading part of 200° C., a screw rotational speed of 125 rpm and a discharge rate of 80 kg/hr while feeding halfway tert-butylperoxyisopropyl monocarbonate ("Perbutyl I", produced by NOF Corporation) by a liquid-feeding pump to account for 1 part by weight per 100 parts by weight of the propylene-butene copolymer, whereby a pelletized maleic anhydride-modified propylene-butene copolymer was obtained.

In the thus-obtained maleic anhydride-modified propylene-butene copolymer, the content (graft ratio) of maleic anhydride group was 1.0 wt % (0.1 mmol/g as maleic anhydride group and 0.2 mmol/g as carboxylic acid group). The weight average molecular weight (in terms of polystyrene) [Mw] was 156,000, and the number average molecular weight [Mn] was 84,000.

Example 1

Production and Evaluation of Aqueous Resin Dispersion

In a glass flask equipped with a reflux condenser, a thermometer and a stirrer, 100 g of the maleic anhydride-modified propylene-butene copolymer obtained in Production Example 1 and 50 g of toluene were put; the inside of the vessel was displaced by nitrogen gas; and the temperature was raised to 110° C. After raising the temperature, 2.0 g of maleic anhydride was added, furthermore, 1 g of tert-butylperoxyisopropyl monocarbonate ("Perbutyl I", produced by NOF Corporation) was added, and stirring was continued at the same temperature for 7 hours to perform the reaction.

In the obtained maleic anhydride-modified propylene-butane copolymer, the content (graft ratio) of maleic anhydride group was 2.0 wt % (0.2 mmol/g as maleic anhydride group and 0.4 mmol/g as carboxylic acid group).

After the completion of reaction, the system was cooled to near room temperature, and 70 g of toluene was added. Subsequently, 10 g of "Jeffamine M-2005" [corresponding to 10 parts by weight of the polyether resin (B1) per 100 parts by weight of the polyolefin (A)] dissolved in 90 g of 2-propanol was added and reacted at 70° C. for 1 hour. Furthermore, 15 g of "Jeffamine M-1000" [corresponding to 15 parts by weight of the polyether resin (B2) per 100 parts by weight of the polyolefin (A)] dissolved in 90 g of 2-propanol was added and reacted at 70° C. for 1 hour.

Thereafter, the inside of the system was neutralized by adding 2 g of dimethylethanolamine and 54 g of water. With keeping the temperature of the obtained reaction solution at 45° C. and with heating/stirring and adding dropwise 300 g of water, toluene and 2-propanol were removed by distillation under reduced pressure by lowering the degree of pressure reduction in the system until the polymer concentration reaches 30 wt %, as a result, a milky white aqueous resin dispersion was obtained.

The dispersed particle diameter (50% particle diameter $D_{50}$) of the obtained aqueous resin dispersion was 110 nm. The results from evaluating the blocking resistance and contact angle of this aqueous resin dispersion are shown in Table 2.

Example 2

Production and Evaluation of Aqueous Resin Dispersion

The production and evaluation were performed in the same manner as in Example 1 except that the amount of "Jeffamine M-2005" described in Example 1 was changed from 10 g to 20 g. The dispersed particle diameter (50% particle diameter $D_{50}$) of the obtained aqueous resin dispersion was 70 nm. The results from evaluating the blocking resistance and contact angle of this aqueous resin dispersion are shown in Table 2.

Example 3

Production and Evaluation of Aqueous Resin Dispersion

The production and evaluation were performed in the same manner as in Example 1 except that the amount of "Jeffamine M-2005" described in Example 1 was changed from 10 g to 20 g and the amount of "Jeffamine M-1000" was changed from 15 g to 10 g. The dispersed particle diameter (50% particle diameter $D_{50}$) of the obtained aqueous resin dispersion was 90 nm. The results from evaluating the blocking resistance and contact angle of this aqueous resin dispersion are shown in Table 2.

Example 4

Production and Evaluation of Aqueous Resin Dispersion

The production and evaluation were performed in the same manner as in Example 1 except that the amount of "Jeffamine M-2005" described in Example 1 was changed from 10 g to 30 g and the amount of "Jeffamine M-1000" was changed from 15 g to 5 g. The dispersed particle diameter (50% particle diameter $D_{50}$) of the obtained aqueous resin dispersion was 100 nm. The results from evaluating the blocking resistance and contact angle of this aqueous resin dispersion are shown in Table 2.

Example 5

Production and Evaluation of Aqueous Resin Dispersion

The production and evaluation were performed in the same manner as in Example 1 except that in Example 1, 6 g of "Jeffamine M-600" was used in place of "Jeffamine M-2005". The dispersed particle diameter (50% particle diameter $D_{50}$) of the obtained aqueous resin dispersion was 110 nm. The results from evaluating the blocking resistance and contact angle of this aqueous resin dispersion are shown in Table 2.

Example 6

Production and Evaluation of Aqueous Resin Dispersion

The production and evaluation were performed in the same manner as in Example 5 except that the amount of "Jeffamine M-1000" described in Example 5 was changed from 15 g to 10 g. The dispersed particle diameter (50% particle diameter $D_{50}$) of the obtained aqueous resin dispersion was 130 nm. The results from evaluating the blocking resistance and contact angle of this aqueous resin dispersion are shown in Table 2.

Comparative Example 1

Production and Evaluation of Aqueous Resin Dispersion

In a glass flask equipped with a reflux condenser, a thermometer and a stirrer, 50 g of toluene and 100 g of the maleic anhydride-modified propylene-butene copolymer obtained in Production Example 1 were put; the inside of the vessel was displaced by nitrogen gas; and the temperature was raised to 110° C. After raising the temperature, 1.5 g of maleic anhydride was added, furthermore, 1 g of tert-butylperoxyisopropyl monocarbonate ("Perbutyl I", produced by NOF Corporation) was added, and stirring was continued at the same temperature for 7 hours to perform the reaction.

In the obtained maleic anhydride-modified propylene-butane copolymer, the content (graft ratio) of maleic anhydride group was 2.0 wt % (0.2 mmol/g as maleic anhydride group and 0.4 mmol/g as carboxylic acid group).

After the completion of reaction, the system was cooled to near room temperature, and 70 g of toluene was added. Subsequently, 20 g of "Jeffamine M-1000" [corresponding to 20 parts by weight of the polyether resin (B2) per 100 parts by weight of the polyolefin (A)] dissolved in 180 g of 2-propanol was added and reacted at 70° C. for 1 hour.

Thereafter, the inside of the system was neutralized by adding 2 g of dimethylethanolamine and 54 g of water. With keeping the temperature of the obtained reaction solution at 45° C. and with heating/stirring and adding dropwise 300 g of water, toluene and 2-propanol were removed by distillation under reduced pressure by lowering the degree of pressure reduction in the system until the polymer concentration reaches 30 wt %, as a result, a milky white aqueous resin dispersion was obtained.

The dispersed particle diameter (50% particle diameter $D_{50}$) of the obtained aqueous resin dispersion was 140 nm. The results from evaluating the blocking resistance and contact angle of this aqueous resin dispersion are shown in Table 2.

Comparative Example 2

Production and Evaluation of Aqueous Resin Dispersion

In a glass flask equipped with a reflux condenser, a thermometer and a stirrer, 50 g of toluene and 100 g of the maleic anhydride-modified propylene-butene copolymer obtained in Production Example 1 were put, the inside of the vessel was displaced by nitrogen gas, and the temperature was raised to 110° C. After raising the temperature, 0.7 g of maleic anhydride was added, furthermore, 1 g of tert-butylperoxyisopropyl monocarbonate ("Perbutyl I", produced by NOF Corporation) was added, and stirring was continued at the same temperature for 7 hours to perform the reaction.

In the obtained maleic anhydride-modified propylene-butane copolymer, the content (graft ratio) of maleic anhydride group was 1.5 wt % (0.15 mmol/g as maleic anhydride group and 0.3 mmol/g as carboxylic acid group).

After the completion of reaction, the system was cooled to near room temperature, and 70 g of toluene was added. Subsequently, 15 g of "Jeffamine M-1000" [corresponding to 20 parts by weight of the polyether resin (B2) per 100 parts by weight of the polyolefin (A)] dissolved in 180 g of 2-propanol was added and reacted at 70° C. for 1 hour.

Thereafter, the inside of the system was neutralized by adding 1 g of aminomethylpropanol and 54 g of water. With keeping the temperature of the obtained reaction solution at 45° C. and with heating/stirring and adding dropwise 300 g of water, toluene and 2-propanol were removed by distillation under reduced pressure by lowering the degree of pressure reduction in the system until the polymer concentration reaches 30 wt %, as a result, a milky white aqueous resin dispersion was obtained.

The dispersed particle diameter (50% particle diameter $D_{50}$) of the obtained aqueous resin dispersion was 100 nm. The results from evaluating the blocking resistance and contact angle of this aqueous resin dispersion are shown in Table 2.

The invention claimed is:

1. An aqueous resin dispersion wherein a polymer (C) obtained by bonding a polyolefin (A) to a polyether resin (B) is dispersed in water; and the polyether resin (B) contains a polyether resin (B1) having an HLB of less than 8 and a polyether resin (B2) having an HLB of 8 to 20 according to calculation by the Griffin method, and wherein that the polyether resin (B) is represented by formula (1):

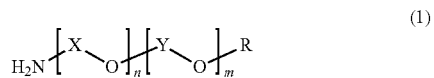

wherein X is an alkylene group having a carbon number of 3 to 4, Y is an alkylene group having a carbon number of 2, R is a hydrogen atom, an amino group, or an alkyl group having a carbon number of 1 to 3, n is a number from 1 to 40, and m is a number from 1 to 30, and wherein the polyolefin (A) is bonded to the polyether resin (B) in a ratio of between 100:10 and 100:50, and the amount of polyether resin (B1) bonded to the polyolefin (A) is from 5 to 40 parts by weight per 100 parts by weight of the polyolefin (A).

2. The aqueous resin dispersion according to claim 1, wherein the weight average molecular weight [Mw] of each of the polyether resin (B1) and the polyether resin (B2) is from 500 to 3,000.

TABLE 2

| | | | | | Example | | | | | | Comparative Example | |
|---|---|---|---|---|---|---|---|---|---|---|---|---|
| | | | | 1 | 2 | 3 | 4 | 5 | 6 | 1 | 2 |
| Blending amount (parts by weight) | Acid-modified polyolefin (A) | Polyolefin | TAFMER XM5070 | 100 | 100 | 100 | 100 | 100 | 100 | 100 | 100 |
| | | Dicarboxylic anhydride | Maleic anhydride | 2 | 2 | 2 | 2 | 2 | 2 | 2 | 1.5 |
| | Polyether resin (B) | Polyether resin (B1) | M-2005 | 10 | 20 | 20 | 30 | | | | |
| | | | M-600 | | | | | 6 | 6 | | |
| | | Polyether resin (B2) | M-1000 | 15 | 15 | 10 | 5 | 15 | 10 | 20 | 15 |
| Blocking resistance | 50° C. · humidity 95% | gf/15 mm | | 6.5 | 5.7 | 7.7 | 1.5 | 2.4 | 2.3 | 8.1 | 38.8 |
| Contact angle | CPP | ° | | 50 | 45 | 46 | 44 | 64 | 66 | 76 | 81 |
| | PET | ° | | 28 | 28 | 26 | 26 | 33 | 36 | 43 | 47 |
| | Al | ° | | 66 | 62 | 57 | 53 | 76 | 77 | 86 | 92 |

As apparent from Table 2, in the aqueous resin dispersions of the present invention of Examples 1 to 6, the blocking resistance and the contact angle were improved, compared with Comparative Examples 1 and 2. This is considered as a result since the polymer (C) of Examples 1 to 6 contains not only the polyether resin (B2) but also the polyether resin (B1).

INDUSTRIAL APPLICABILITY

The aqueous resin dispersion of the present invention can be produced using substantially no normal surfactant, is moreover excellent in the blocking resistance and wettability to the base material, and can be easily coated without limiting the coating method. Accordingly, the aqueous resin dispersion of the present invention is useful as a coating material, a primer, an ink, an adhesive, etc.

While the invention has been described in detail and with reference to specific embodiments thereof, it will be apparent to one skilled in the art that various changes and modifications can be made therein without departing from the spirit and scope of the invention.

3. The aqueous resin dispersion according to claim 1, wherein the polyolefin (A) is a polyolefin (A1) having no reactive group or a polyolefin (A2) having a reactive group.

4. The aqueous resin dispersion according to claim 1, wherein the polyolefin (A2) contains one or more reactive groups (D) selected from the group consisting of a carboxylic acid group, a dicarboxylic anhydride group and a dicarboxylic anhydride monoester group, in a ratio of polyolefin (A2) : reactive group (D)=100:0.1 to 100:5 (weight ratio).

5. The aqueous resin dispersion according to claim 1, wherein the polyolefin (A) is a propylene-α-olefin copolymer having a weight average molecular weight [Mw] of 10,000 to 300,000 and a propylene content of 50 mol % or more.

6. The aqueous resin dispersion according to claim 1, wherein HLB of the polyether resin (B1) is 1 to 6 and HLB of the polyether resin (B2) is 10 to 20.

7. A coating material comprising the aqueous resin dispersion according to claim 1.

8. An adhesive comprising the aqueous resin dispersion according to claim 1.

9. A laminate obtained through steps of applying the aqueous resin dispersion according to claim 1 or the coating material according to claim 7, and heating.

10. A laminate obtained through steps of applying the coating material according to claim 7 and heating.

11. The aqueous resin dispersion according to claim 1, wherein the ratio of polyether resin (B1) to polyether resin (B) is 10 to 90 wt %.

\* \* \* \* \*